Patented May 5, 1953

2,637,709

UNITED STATES PATENT OFFICE 2,637,709

PRODUCTS AND METHODS: REACTING CASHEW NUT SHELL LIQUID AND POLYMERS WITH UNSATURATED FATTY ACIDS

Mortimer T. Harvey, South Orange, N. J., assignor to The Harvel Corporation, a corporation of New Jersey No Drawing. Application September 9, 1950, Serial No. 184,109

4 Claims. (Cl. 260—23)

This invention relates to novel compositions of matter and to methods for preparing them and also to products containing one or more of said novel compositions as components thereof. More particularly this invention is directed to novel products produced by heating under acidic, alkaline or neutral conditions a mixture of an anacardic material selected from the group consisting of decarboxylated cashew nut shell liquid and liquid polymers thereof with mono-carboxylic unsaturated fatty acids selected from the group consisting of palmitoleic, oleic, linoleic, linolenic, arachidonic, clupanodonic, eleostearic, licanic and ricinoleic acids. These fatty acids may be derived from various sources: rosin oils, tall oil and other oils such as china, fish hempseed, linseed, oiticica, perilla, poppyseed, safflower, soyabean, sunflower, tung, walnut, cottonseed, peanut, cocoanut, palm kernel, palm and castor. They may be isolated from each other; however, in many instances they are obtained on the market in combinations with each other and these materials of commerce and especially tall oils, linseed fatty acids and dehydrated castor oil fatty acids are what are preferably employed. The ratio of the anacardic material to the fatty acid in said mixture is in the range of 2 moles of the anacardic material to 1 to 4 moles of the fatty acid, with 300 parts by weight of either of said anacardic materials being considered 1 mole.

This mixture, with or without a catalyst such as potassium acetate, pyridine or the like, is heated to and maintained at a temperature of 450°–650° F. until 15%–50% of the anacardic material has become esterified by reaction with the fatty acid, or the hydroxy content of the mass is 85%–50% of the hydroxy content of the original mixture. This heating of the mixture is carried out in such a system that the water of reaction is continuously removed as it is formed, while the fatty acids or other materials which may be vaporized are condensed and returned to the reacting mix. Thus the mixture is being maintained at such elevated temperatures under refluxing conditions while the water of reaction is removed as formed. After the 15%–50% esterification, the mass may be thickened to the desired viscosity by heating, and in either case may be reacted at 600° F. with an aliphatic polyhydric alcohol such as glycerol, pentaerythritol, diethylene glycol, ethylene glycol, tetraethylene glycol, propylene glycol, butylene glycol, polypropylene glycol, etc. These various polyhydric alcohols may be reacted alone or in various mixtures with the excess fatty acids in said mass and the amount of polyhydric alcohol employed is preferably between 50%–100% of that required to react with all the excess fatty acid present. Also either before or after reacting with the polyhydric alcohol, the mass may be reacted with 0.5%–5% by weight of a reagent containing a reactive methylene group, such as hexamethylene tetramine or an aldehyde, examples of which are trioxymethylene, formaldehyde, paraformaldehyde, trioxane, glyoxal, acrolein, etc., as well as their various polymers.

The cashew nut shell liquid employed herein is substantially completely decarboxylated. This may be done by heating either cold or hot extracted cashew nut shell liquid for a short period at a temperature of 250°–325° F. until substantially all of the COOH group present on the anacardic acid component has been driven off. The cashew nut shell liquid employed herein may have had the more volatile constituents removed by heat and measuring between 0–20% of the weight of the cashew nut shell liquid. If desired the nitrogenous and mineral components may be removed to provide the so-called treated cashew nut shell liquid as normally done although this is not essential to the invention. One method for accomplishing this is to employ the method set forth in the Harvey et al. Patent No. 2,128,247 or that set forth in the U. S. Patent application of Solomon Caplan, S. N. 4,695 filed January 27, 1948, and made part hereof. The liquid polymers of the substantially completely decarboxylated cashew nut shell liquid may be produced by heat alone or in the presence of an acidic or alkaline catalyst to provide liquid polymers thereof. When the liquid polymers are employed herein and have been produced by heating in the presence of an acidic catalyst, I prefer that they be treated with an alkali to render them slightly alkaline before mixing them with the unsaturated fatty acid.

The novel compositions of this invention when spread in the form of a thin film will dry on exposure to air or when baked in an oven at 285° F. These novel compositions, either modified or unmodified, find application as coating materials, electrical insulating materials, also as components of friction elements such as brake linings and clutch facings. They are soluble in petroleum spirits, xylol, toluol, etc. and may be modified by sulphurization, halogenation and/or reaction with one of the before mentioned reactive methylene group containing agents.

In order to sulphurize said novel compositions, 100 parts thereof are mixed with a quantity of sulphur, sulphur chloride, sodium polysulphide or the like having 2 to 30 parts of available sulphur. This mixture preferably under alkaline conditions by the addition of lime or the like is heated while agitated to a temperature of 250°–400° F. for 1 to 2 hours to provide sulphurized products containing 1%–30% of combined sulphur based on the weight of the unsulphurized novel compositions.

In order to halogenate, chlorine, the more common halogen, may be passed into said novel compositions with or without a solvent while maintaining them at temperatures between room temperature and 150° F. until the quantity of chlorine absorbed is between 1%–25% based on the weight of the unchlorinated novel compositions.

In order to react said novel compositions with a methylene containing agent, in general 100 parts thereof are mixed with .05 to 8 parts of said agent. This mixture together with an acidic or alkaline catalyst is heated to 300°–350° F. for 1 to 3 hours to convert the mass to the dry, hard and infusible state.

These novel compositions may be converted to the above infusible state by heat alone, that is by baking for 1 to 3 hours at 300°–350° F.

The following are examples for making some of the compositions of this invention, and are set forth merely by way of illustration and not by way of limitation, all parts being given by weight unless otherwise specified.

Example 1

Two parts of commercial linseed oil unsaturated fatty acids (chiefly oleic, linoleic and linolenic) were mixed with 3 parts of treated cashew nut shell liquid. The acid number of this mix was determined and found to be 70.6. Then the mixture was heated to 570° F. and maintained at that temperature for 1½ hours while the water of reaction was removed as formed and the vaporized fatty acids condensed and returned to the mix. Then the acid number was determined and found to be 28.8. Heat was removed and the mass was cooled to room temperature at which temperature it was a thick liquid hereinafter known as product 1.

Example 2

The same procedure as that set forth in Example 1 is employed except that 2 parts of tall oil (containing approximately 65% of unsaturated fatty acids) is employed in place of the linseed oil fatty acids. The initial mass had an acid number of 82.9 and the corresponding characteristic of the end product was 16.2. This product is known hereinafter as product 2.

Example 3

300 parts of cashew nut shell liquid and 280 parts of linoleic acid were mixed together. This mixture, which had an acid number of approximately 100, was heated to 525° F. for 10 minutes. Then the temperature was dropped to 480° F. and maintained at that temperature for 2 to 6 hours until the acid number of the resultant product was approximately 15. This product is known hereinafter as product 3.

Example 4

400 parts of polymerized cashew nut shell liquid (viscosity 1000 cp. at 25° C.) and 280 parts of oleic acid were mixed together. This mixture, whose acid number is approximately 83, was heated to 525° F. for 10 minutes. Then the temperature was dropped to 480° F. and so maintained until the acid value of the resultant product was approximately 10. This product is known hereinafter as product 4.

Example 5

300 parts of cashew nut shell liquid and 200 parts of fish oil unsaturated fatty acids (chiefly palmitoleic, oleic, linoleic, linolenic, arachidonic, clupendonic) were mixed together and heated at 535° F. for 10 minutes. Then the temperature was dropped to 480° F. and thus maintained until the acid number of the resultant product was reduced more than 50%. This product is known hereinafter as product 5.

Example 6

600 parts of cashew nut shell liquid and 350 parts of commercial oiticica oil unsaturated fatty acids (oleic and liconic) were mixed together. This mixture was heated at a temperature of 350°–400° F. while maintained under a vacuum of at least 20 mm. of mg. pressure and until the acid number is reduced to approximately 25. This product is known hereinafter as product 6.

Example 7

Employing exactly the same procedure as that set forth in Example 6 except that 350 parts of tung oil unsaturated fatty acids (oleic and oleostearic) is employed in place of the oiticica unsaturated fatty acids, there is produced a product whose acid number is reduced to approximately 30. This product is known hereinafter as product 7.

Example 8

700 parts of treated cashew nut shell liquid, 466 parts tall oil and 10 parts of potassium acetate (catalyst) were mixed together and refluxed at 600° F. for 3 hours while continually removing the water of reaction as formed and 30 parts of water were collected. The acid value and hydroxy content of the original mix were 44.5 and 3.54% respectively and at the end of said 3 hour period were reduced to 13.1 and 2.6% respectively. The end product is known hereinafter as product 8.

Example 9

450 parts of treated cashew nut shell liquid, 300 parts of tall oil and 120 parts of pyridine (catalyst) were mixed together and heated at 320° F. for 1 hour under reflux condenser to initiate the reaction. Then the temperature was increased to 600° F., the pyridine recovered, and the 600° F. temperature maintained under reflux conditions for 2 hours to remove water and continue the reaction. The hydroxy content at the end of the 2 hour period was 2.1%. The end product is known as product 9.

Example 10

562 parts of treated cashew nut shell liquid, 377 parts of tall oil and 150 parts of pyridine were mixed together and treated in the same manner as that set forth in Example 9. The end product is known as product 10. At the end of the 2 hour period of refluxing, 14.3 grams of pentaerythritol was added to the mass and maintained at 600° F. for an additional ½ hour whereupon the polyhydric alcohol reacted with the excess fatty acids in the mass. The acid value of the resultant product known as product 10-A had an acid value of 4.2. Then 600 parts of product 10-A were mixed with 6 parts of hexamethylene tetramine and maintained at 350° F. for 6 to 8 hours to provide a substantially infusible solid resin. To 600 parts of product 10-A which had been thickened by heating to 600° F. to a very viscous mass were added 1200 parts of mineral spirits and 12 grams of a copper drier. This solution was coated on a base and maintained at 300° F. to drive off the solvent and convert the mass to the solid state.

*Example 11*

700 parts of treated cashew nut shell liquid and 466 parts of distilled linseed fatty acids were mixed together and heated to 600° F. and maintained at that temperature under reflux conditions for 2 hours while removing the water as formed. 34 cc. of water was collected and the resulting product, known as product 11, had a hydroxy content of 2.1% and acid number of 19.

*Example 12*

300 parts of treated cashew nut shell liquid, 200 parts of tall oil and 80 parts of pyridine were mixed together and refluxed at 320° F. for about 1½ hours to initiate the reaction. The temperature was increased to distill off the pyridine which was recovered and the mass was maintained at 600° F. for 2 hours under reflux conditions while continuously removing the water and increasing the reaction. A sample was taken at the end of the 2 hour period and the product, known as product 12, was found to have a much greater viscosity than the original mix and to have a hydroxy content of .9.

All of said products 1–12 had a hydroxy content measuring between 85%–50% of the hydroxy content of the original mix employed for producing said products.

*Example 13*

Any one of the illustrative products, namely products 1–12 may be mixed with an aliphatic polyhydric alcohol in the desired proportion and maintained at 450°–600° F. to react with the excess fatty acid therein to provide products 1–X to 12–X.

*Example 14*

Any one of the illustrative products 1–12 or 1–X to 12–X may be mixed with an agent containing a reactive methylene group and heat converted at 300°–600° F. to the substantially solid and infusible state or to the intermediate state and known as products 1–I to 12–I and 1–X–I to 12–X–I so that upon the further application of heat the mass may be converted to the infusible state.

These various products 1 to 12, 1–X to 12–X, 1–I to 12–I and 1–X–I to 12–X–I find application in a wide variety of different fields. They alone or in combination with other materials find application as components of asbestos brake linings and clutch facings of either the woven or matted type.

One of the more important classes of articles of manufacture which may be produced by employing these novel products are various bases coated with a film of said products which are then dried, and for commercial purposes generally converted into the substantially dry and solid state by means of heat. These products are especially useful either alone or in combination with other materials for the production of flexible cable cloth because of the desirable electrical properties imparted thereto by the presence of one or more of these novel products. They impart low power factor and high dielectric characteristics and act to improve the tensile strength without materially impairing the elongation and tear characteristics.

A base such as a woven fabric of cotton, rayon, silk, nylon, cellulose acetate, fiber glass or the like of approximately 1 to 5 mils in thickness is employed. The base is coated with 1 to 4 coats which together when dry total 2 to 15 mils in thickness to provide commercial cable cloth. These novel compositions may be modified by employing them with drying, semi-drying or non-drying oils in the desired proportions with or without resinous materials such as the oil soluble phenol-aldehyde resins, terpene resins, alkyd resins, formaldehyde-ketone resins, furfuraldehyde-ketone resins, phenolic ether resins, asphalt, gilsonite, vegetable-, mineral- and animal-pitches and pitchy residues. There also may be combined therewith one or more of the well known metallic driers. These various compositions are generally thinned with a solvent to the required degree of concentration and are then deposited on the base material which passes through an oven whereby the solvent is first driven off and then the remaining coated material is converted to the substantially dry state.

The following examples are merely given to illustrate an application for some of the novel compositions and some of the commercial end products produced therewith.

*Example 15*

70 parts of product 2 was heated to 600° F. and maintained at that temperature of 600° F. to increase the body or viscosity thereof. Then it was cooled to 400° F. and 30 parts of mineral spirits added. Then 2.5 parts of 8% copper naphthenate drier were added and the entire mass was stirred to obtain a uniform distribution of the drier throughout. Then a base cloth which is a 64 x 60 cotton starched sized, is coated with said composition which is dried at about 300° F. to provide approximately a 1.5 mil coat. This procedure is repeated any number of times depending on the thickness of the coating desired. In this instance this procedure was continued until the overall thickness was 10 mils. The volt per mil characteristic was measured and found to be 1200–1400 and the power factor measured 1.5 to 4.

*Example 16*

240 lbs. of product 1, 180 lb. phenol-formaldehyde resin (oil soluble) and 271 lb. asphalt were heated to about 530° F. and maintained at that temperature for about 20 minutes. Then 689 lb. dehydrated castor oil were added and the mass heated to about 580° F. for approximately 1 hour. Then 310 lb. of linseed oil was added thereto. The mass was cooled and 702 lb. mineral spirits together with 6 lb. metallic drier containing lead and manganese were added and the mass stirred to uniform distribution. This material was applied in the same manner set forth in Example 15. The power factor was measured and found to be approximately 3.5 to 5 and the VPM was between 1100–1200.

*Example 17*

Employing the same procedure as that set forth in Example 16 except that product 2 was employed in place of product 1, the power factor was found to be 2.5 to 4 and the VPM was between 1100–1200.

While the invention has been described in detail, it is not to be limited thereby because various changes and modifications may be made within the spirit thereof.

Having thus described the invention, what is claimed is:

1. The method comprising heating a mixture of anacardic material selected from the group consisting of (1) decarboxylated cashew nut shell liquid, (2) liquid polymers thereof and (3) mixtures thereof and unsaturated fatty acid selected from the group consisting of palmitoleic, oleic, linoleic, linolenic, arachidonic, licanic, clupanodonic, oleostearic and ricinoleic acids and mixtures thereof, the mole ratio of said anacardic material to unsaturated fatty acid being in the range of 2–1 to 2–4, maintaining said mixture at elevated temperature under reflux conditions while removing water of reaction as it is formed and until the hydroxy content of the mass measures between 85%–50% of the hydroxy content of the original mixture.

2. The method of claim 1 and then heating said mass together with an aliphatic polyhydric alcohol.

3. The product made according to claim 1.

4. The product made according to claim 2.

MORTIMER T. HARVEY.

References Cited in the file of this patent

UNITED STATES PATENTS

| Number | Name | Date |
|---|---|---|
| 1,725,797 | Harvey | Aug. 27, 1929 |
| 1,893,873 | Kienle | Jan. 10, 1933 |
| 2,143,880 | Hughes | Jan. 17, 1939 |